(12) United States Patent
Fadhel et al.

(10) Patent No.: US 11,059,720 B1
(45) Date of Patent: Jul. 13, 2021

(54) CATALYST CARRIER FOR DRY REFORMING PROCESSES

(71) Applicant: Saudi Arabian Oil Company, Dhahran (SA)

(72) Inventors: Bandar A. Fadhel, Dhahran (SA); Bandar H. Alsolami, Dhahran (SA); Rami Bamagain, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/775,081

(22) Filed: Jan. 28, 2020

(51) Int. Cl.
*C01B 3/32* (2006.01)
*C01B 32/40* (2017.01)
*B01J 21/04* (2006.01)

(52) U.S. Cl.
CPC .............. *C01B 3/326* (2013.01); *B01J 21/04* (2013.01); *C01B 32/40* (2017.08); *C01B 2203/0238* (2013.01); *C01B 2203/1041* (2013.01); *C01B 2203/1623* (2013.01); *C01B 2203/1638* (2013.01)

(58) Field of Classification Search
CPC .............. C01B 3/40; C01B 2203/1082; C01B 2203/0244; C01B 2203/1241; B01J 35/026; B01J 35/023; B01J 23/02; B01J 23/78
See application file for complete search history.

(56) References Cited

U.S. PATENT DOCUMENTS

| | | | |
|---|---|---|---|
| 4,017,425 A | 4/1977 | Shiao | |
| 4,451,578 A | 5/1984 | Setzer | |
| 6,340,437 B1 * | 1/2002 | Yagi | B01J 23/40 |
| | | | 252/373 |
| 10,179,326 B2 | 1/2019 | Basset et al. | |
| 2003/0024806 A1 * | 2/2003 | Foret | C10J 3/54 |
| | | | 204/164 |
| 2016/0129423 A1 * | 5/2016 | Basset | C07C 2/76 |
| | | | 423/651 |
| 2019/0308183 A1 | 10/2019 | Agblevor | |

FOREIGN PATENT DOCUMENTS

| | | |
|---|---|---|
| CN | 104627960 A | 5/2015 |
| CN | 105478120 A | 4/2016 |
| CN | 107433200 A | 12/2017 |
| GB | 714284 A | 8/1954 |

(Continued)

OTHER PUBLICATIONS

U.S. Appl. No. 16/775,019, "Nickel-Containing Catalyst Composition Having Enhanced Acidity for Dry Reforming Processes", filed Jan. 28, 2020.

(Continued)

*Primary Examiner* — Anthony J Zimmer
*Assistant Examiner* — Syed T Iqbal
(74) *Attorney, Agent, or Firm* — Bracewell LLP; Constance G. Rhebergen; Kevin R. Tamm

(57) ABSTRACT

Methods for dry reforming with a red mud catalyst support composition, one method including providing a methane feed and carbon dioxide feed to react over the red mud catalyst support composition at increased temperature and increased pressure to produce synthesis gas comprising $H_2$ and CO, the composition comprising red mud material produced from an alumina extraction process from bauxite ore.

14 Claims, 1 Drawing Sheet

(56) References Cited

FOREIGN PATENT DOCUMENTS

| GB | 916216 A | 1/1963 |
|---|---|---|
| JP | S60203694 A | 10/1985 |
| JP | 2007084389 A | 4/2007 |
| RU | 2542177 C1 | 2/2015 |
| WO | 0000285 A1 | 1/2000 |
| WO | 2010118133 A1 | 10/2010 |
| WO | 2019138002 A1 | 7/2019 |

OTHER PUBLICATIONS

U.S. Appl. No. 16/775,035, "Nickel-Containing Catalyst Composition Having Enhanced Acidity for Steam Reforming Processes", filed Jan. 28, 2020.
U.S. Appl. No. 16/775,050, "Nickel-Containing Catalyst Composition Having Enhanced Acidity for Autothermal Reforming Processes", filed Jan. 28, 2020.
U.S. Appl. No. 16/775,063, "Nickel-Containing Catalyst Composition Having Enhanced Acidity for Bi-Reforming Processes", filed Jan. 28, 2020.
U.S. Appl. No. 16/775,096, "Catalyst Carrier for Steam Reforming Processes", filed Jan. 28, 2020.
U.S. Appl. No. 16/775,102, "Catalyst Carrier for Autothermal Reforming Processes", filed Jan. 28, 2020.
U.S. Appl. No. 16/775,119, "Catalyst Carrier for Bi-Reforming Processes", filed Jan. 28, 2020.
U.S. Appl. No. 16/775,135, "Catalyst Compositions Having Enhanced Acidity for Dry Reforming Processes", filed Jan. 28, 2020.
U.S. Appl. No. 16/775,147, "Catalyst Compositions Having Enhanced Acidity for Steam Reforming Processes", filed Jan. 28, 2020.
U.S. Appl. No. 16/775,158, "Catalyst Compositions Having Enhanced Acidity for Autothermal Reforming Processes", filed Jan. 28, 2020.
U.S. Appl. No. 16/775,167, "Catalyst Compositions Having Enhanced Acidity for Bi-Reforming Processes", filed Jan. 28, 2020.
Alharthi et al., "Hydrocarbon Cracking Over Red Mud and Modified Red Mud Samples," Journal of Sustainable Metallurgy 2:387-393, 2016.
Balakrishnan et al., "Hydrogen production from methane in the presence of red mud—making mud magnetic," Green Chemistry, 11, 42-47, 2009.
Balakrishnan et al., "Waste materials—catalytic opportunities: an overview of the application of large scale waste materials as resources for catalytic applications," Green Chemistry, 2011, 13, 16.
Bennett et al., "Catalytic Applications of Waste Derived Materials", Journal of Materials Chemistry A, pp. 1-22, 2013.
Dulger Irdem et al. "Steam Reforming of Tar Derived from Walnut Shell and Almond Shell Gasification on Red Mud and Iron-Ceria Catalysts", Energy&Fuels, 2014.
Fang et al., "A Nanomesoporous Catalyst from Modified Red Mud and Its Application for Methane Decomposition to Hydrogen Production," Journal of Nanomaterials, Hindawi, 2016.
Liu et al., "Preparation of Modified Red Mud-Supported Fe Catalysts for Hydrogen Production by Catalytic Methane Decomposition," Journal of Nanomaterials, Article ID 8623463, 2017.
Ortiz et al. "Hydrogen production with CO2 capture by coupling steam reforming of methane and chemical-looping combustion: Use of an iron-based waste product as oxygen carrier burning a PSA tail gas," Journal of Power Sources, 196, pp. 4370-4381, 2011.
Cheng, et al., "Tar Elimination from Biomass Gasification Syngas with Bauxite Residue Derived Catalysts and Gasification Char", Applied Energy, 258, 2020.
Das, et al., "A Review on Advances in Sustainable Energy Production through Various Catalytic Processes by using Catalysts Derived from Waste Red Mud", Renewable Energy, 143, Elsevier, pp. 1791-1811, May 31, 2019.
Duman, et al., "Hydrogen Production from Algal Biomass via Steam Gasification", Bioresource Technology, 166, pp. 24-30, May 5, 2014.
Ebrahiminejad, et al., "Hydrocracking and Hydrodesulfurization of Diesel over Zeolite Beta-Containing NiMo Supported on Activated Red Mud", Advanced Powder Technology, 30, Elsevier, pp. 1450-1461, dated May 17, 2019.
International Search Report and Written Opinion for PCT Application No. PCT/US2021/015132 dated Mar. 29, 2021.
International Search Report and Written Opinion for PCT Application No. PCT/US2021/015133 dated Mar. 29, 2021.
International Search Report and Written Opinion for PCT Application No. PCT/US2021/015134 dated Mar. 29, 2021.
International Search Report and Written Opinion for PCT Application No. PCT/US2021/015188 dated Mar. 29, 2021.
International Search Report and Written Opinion for PCT Application No. PCT/US2021/015191 dated Mar. 29, 2021.
International Search Report and Written Opinion for PCT Application No. PCT/US2021/015194 dated Mar. 29, 2021.
International Search Report and Written Opinion for PCT Application No. PCT/US2021/015196 dated Apr. 14, 2021.
International Search Report and Written Opinion for PCT Application No. PCT/US2021/015303 dated Mar. 30, 2021.
International Search Report and Written Opinion for PCT Application No. PCT/US2021/015307 dated Mar. 31, 2021.
International Search Report and Written Opinion for PCT Application No. PCT/US2021/015370 dated Apr. 14, 2021.
International Search Report and Written Opinion for PCT Application No. PCT/US2021/015371 dated Mar. 31, 2021.
Irdem et al., "Steam Reforming of Tar Derived from Walnut Shell and Almond Shell Gasification on Red Mud and Iron-aeria Catalysts", Energy Fuels, ACS Publications, vol. 28, pp. 3808-3813, 2014.
Jahromi, et al., "Hydrodeoxygenation of Aqueous-Phase Catalytic Pyrolysis Oil to liquid Hydrocarbons Using Multifunctional Nickel Catalyst", I&EC research, vol. 57, pp. 13257-13268, Sep. 7, 2018.
Mathur, et al., "Ore Catalysts in Two-Stage Coal Fuel", vol. 65, dated Jun. 1, 1986.
Paredes, et al., "Catalytic Combustion of Methane over Red Mud-Based Catalysts", Applied Catalysis, Environmental, vol. 47, pp. 37-45, Jan. 1, 2004.

* cited by examiner

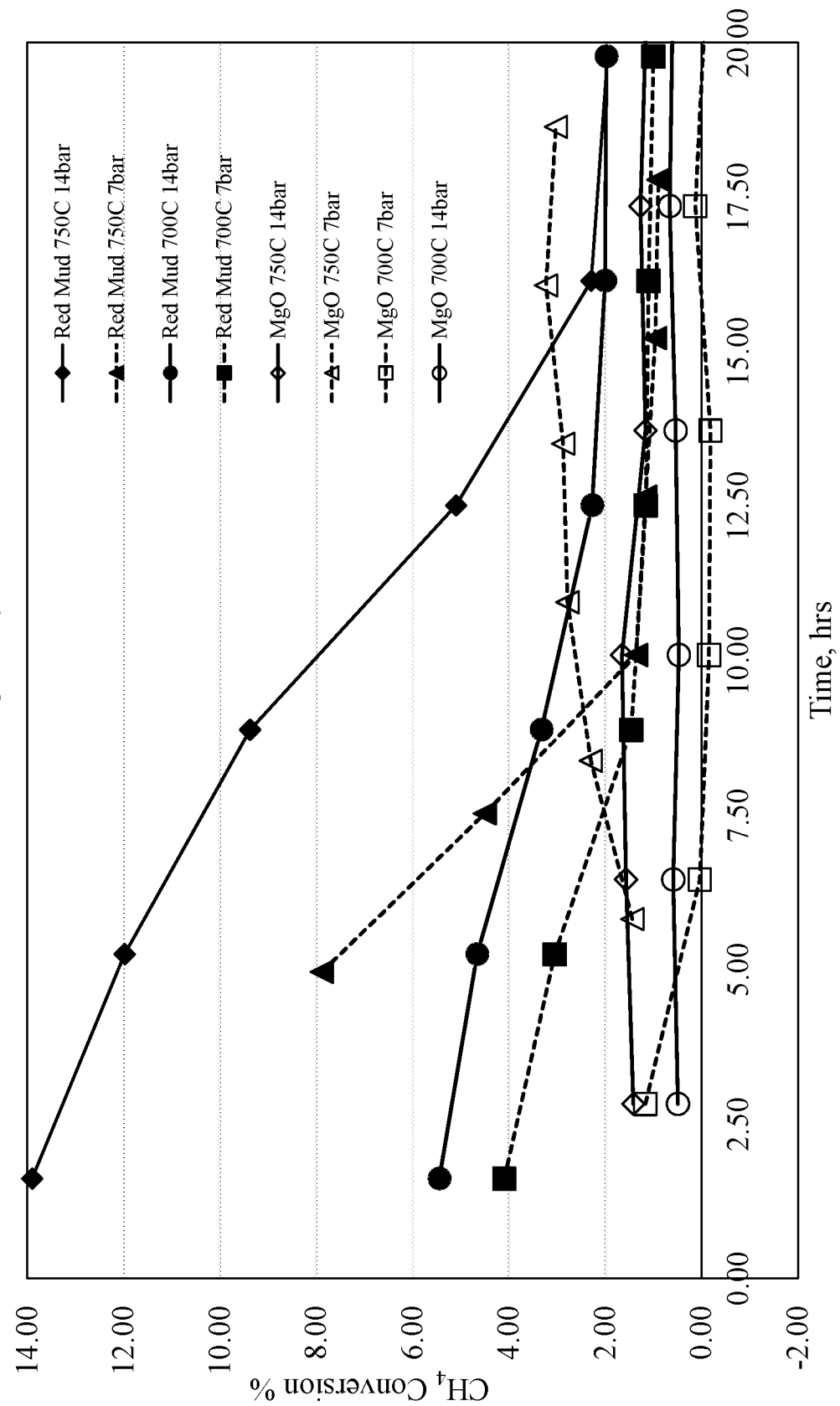

CATALYST CARRIER FOR DRY REFORMING PROCESSES

BACKGROUND

Field

Embodiments of the disclosure relate to catalyst carrier compositions for use in reforming processes. In particular, certain embodiments of the disclosure relate to catalyst carrier compositions for and methods of dry reforming.

Description of the Related Art

Dry reforming simultaneously utilizes two greenhouse gases, $CH_4$ and $CO_2$, to produce synthesis (syn) gas (CO and $H_2$). However, one challenge of dry reforming is the lack of available, durable, and cost-effective catalyst and catalyst carriers. Dry reforming generally applies a catalyst, increased temperature, and increased pressure in a process generally according to Equation 1.

$$CH_4 + CO_2 \rightarrow 2H_2 + 2CO \quad \text{Eq. 1}$$

Dry reforming generally is not as common as steam reforming, and one use is in processes that require a high proportion of CO versus $H_2$ in the produced synthesis gas. The thermodynamics of dry reforming are similar to those of steam reforming. One difference of dry reforming from steam reforming is dry reforming's tendency for coking, increased by a lack of steam to remove carbon deposits. In some applications like mixed reforming or bi-reforming (a combination of steam and dry reforming), steam is added for effective reduction or removal of coke. Since coking can quickly deactivate Ni catalysts, Rh and Ru catalysts are used in some dry reforming applications.

Present catalyst and catalyst carrier technology is insufficient in some processes to provide cost-effective means for dry reforming.

SUMMARY

Applicant has recognized a need for catalyst carrier compositions comprising red mud to be applied in systems and processes for dry reforming. Red mud catalyst carrier compositions for use in dry reforming are disclosed. The red mud catalyst carrier compositions in some embodiments contain Fe, Al, Si, Na, Ca, and Ti oxides from red mud, and the compositions act as a base support for catalytically active compositions, for example added metals and metal oxides. A factor in designing suitable reforming catalysts is the catalyst support or base material, which can have an active catalytic role in a catalytic reaction or be merely inert. In embodiments of the present disclosure, red mud acts as a catalyst carrier. Disclosed compositions are useful as a catalyst carrier in dry reforming processes for the conversion of methane to syngas, according to Equation 1. Utilization of red mud in dry reforming processes provides the concurrent advantages of utilizing a waste material (red mud), converting $CO_2$ (a greenhouse gas), and producing $H_2$.

Red mud is a caustic waste material produced from bauxite ore processing for alumina extraction, and is utilized here as a catalyst carrier for a dry reforming process. Surprisingly and unexpectedly, without being specifically designed as a catalyst or carrier (for example using specific zeolitic structure), red mud waste material can be readily used as a catalyst carrier. Dry reforming is considered to be a green method for the production of syngas ($H_2$ and CO), since it utilizes as reactants two greenhouse gases, $CH_4$ and $CO_2$. Despite that, widespread adoption of dry reforming processes has been stymied due in part to the lack of commercially-available durable and efficient catalysts carriers. Red mud generally includes a mixture of transition metals such as Ti, Fe, and Al, which make it an advantageous catalyst in addition to or alternative to catalyst carrier for dry reforming processes, for example once modified with nickel in addition to or alternative to other metals, such as transition metals and their oxides.

Embodiments disclosed here apply red mud as a catalyst support or base material, while offering some catalytic activity itself for dry reforming of methane.

Therefore, disclosed here is a method for dry reforming with a red mud catalyst support composition, the method including providing a methane feed and carbon dioxide feed to react over the red mud catalyst support composition at increased temperature and increased pressure to produce synthesis gas comprising $H_2$ and CO, the composition comprising: red mud material produced from an alumina extraction process from bauxite ore. In some embodiments, the composition further comprises at least one added catalytic metal, the added catalytic metal not being present in an unmodified form of the red mud material produced from the alumina extraction process from bauxite ore. Still in other embodiments, the at least one added catalytic metal is a Periodic Table Group 3-12 metal. In certain embodiments, the increased temperature is between about 500° C. to about 1000° C. In other embodiments, the increased temperature is between about 600° C. to about 800° C. In yet other embodiments, the increased temperature is between about 700° C. to about 750° C.

In other embodiments of the method, the increased pressure is between about 5 bar and about 20 bar. Still in certain other embodiments, the increased pressure is between about 7 bar and about 15 bar. In some embodiments, the increased pressure is about 14 bar. In some other embodiments, the methane conversion rate is at least about 10% for at least about 6 hours. Still in other embodiments, the methane conversion rate is at least about 4% for at least about 6 hours. Still in other embodiments, gas hourly space velocity of the methane feed and carbon dioxide feed mixed is between about $1000\ h^{-1}$ to $10000\ h^{-1}$, or is about $3,000\ h^{-1}$ or is about $5000\ h^{-1}$. In some embodiments, the composition includes at least one component selected from the group consisting of: $Fe_2O_3$, $Al_2O_3$, $SiO_2$, $Na_2O$, CaO, and $TiO_2$. Still in other embodiments, a majority of the particles of the composition have a particle size of less than about 70 In certain embodiments, a molar ratio of the methane feed to the carbon dioxide feed is between about 1:1 and about 1:1.75. Still in yet other embodiments, produced $H_2$ is at least about 5 mol. % of produced products from the reaction. In certain embodiments, the composition includes between about 20 wt. % and about 30 wt. % $Al_2O_3$, between about 5 wt. % and about 10 wt. % CaO, between about 15 wt. % and about 25 wt. % $Fe_2O_3$, between about 5 wt. % and about 15 wt. % $Na_2O$, between about 15 wt. % and about 25 wt. % $SiO_2$, and between about 5 wt. % and about 10 wt. % $TiO_2$.

BRIEF DESCRIPTION OF THE DRAWINGS

These and other features, aspects, and advantages of the present disclosure will become better understood with regard to the following descriptions, claims, and accompanying drawing. It is to be noted, however, that the drawing illustrates only several embodiments of the disclosure and is therefore not to be considered limiting of the disclosure's scope as it can admit to other equally effective embodiments.

FIG. 1 is a graph showing conversion percentage for $CH_4$ in a dry reforming process for unmodified red mud used as a catalyst support and for MgO used as a catalyst support.

DETAILED DESCRIPTION

So that the manner in which the features and advantages of the embodiments of compositions of red mud along with systems and methods for dry reforming with such compositions, may be understood in more detail, a more particular description of the embodiments of the present disclosure briefly summarized previously may be had by reference to the embodiments thereof, which are illustrated in the appended drawing, which form a part of this specification. It is to be noted, however, that the drawing illustrates only various embodiments of the disclosure and is therefore not to be considered limiting of the present disclosure's scope, as it may include other effective embodiments as well.

As noted, red mud is a caustic waste material generated during alumina extraction from bauxite ore. Red mud includes a mixture of transition metals, for example as listed in Table 1.

TABLE 1

| Example composition ranges for global red mud. | | | | | | |
|---|---|---|---|---|---|---|
| Component | $Fe_2O_3$ | $Al_2O_3$ | $SiO_2$ | $Na_2O$ | CaO | $TiO_2$ |
| Approx. Weight Percentage | 30-60% | 10-20% | 3-50% | 2-10% | 2-8% | 10% |

A Saudi Arabian red mud sample was evaluated for dry reforming activities at different temperatures and pressures, as shown in FIG. 1. The results are compared to MgO catalyst support material. MgO is a commercially-available catalyst support material known for a variety of reforming processes with a surface area of about 29 $m^2$/g. The MgO was tested as received. FIG. 1 shows that red mud surprisingly and unexpectedly outperforms MgO as a support for dry reforming catalyst in terms of methane conversion, especially at high pressure which is a preferred condition for industry application of dry reforming. Red mud samples show high conversion rates during early startup of the reaction, for example up to and at about 5 hours, which enhances the overall dry reforming process and startup.

Saudi Arabian red mud from Ma'aden Aluminium Company, based at Ras Al Khair, Saudi Arabia was used in the test runs. Table 2 shows the weight percent for certain components in the Saudi Arabian red mud composition.

TABLE 2

| Certain component weight percentages in Saudi Arabian red mud (RM) catalyst/catalyst support composition. | | | | | | |
|---|---|---|---|---|---|---|
| Component | $Fe_2O_3$ | $Al_2O_3$ | $SiO_2$ | $Na_2O$ | CaO | $TiO_2$ |
| Weight Percentage | 18.75% | 25.22% | 18.88% | 11.77% | 7.97% | 6.89% |

The red mud was tested as-is without further treatment, for example acid or base treatment, for use as a catalyst support with a Brunauer-Emmett-Teller (BET) surface area of about 16 $m^2$/g.

Several tests on red mud support catalytic activity and MgO support catalytic activity for dry reforming were experimentally conducted. Saudi Arabian red mud was tested as received as a catalyst support without any modifications, and it was placed in an Avantium Flowrence® catalyst testing reactor to perform dry reforming experiments, and similar tests were performed for the MgO catalyst support. The Avantium Flowrence® reactor is a flexible, high-throughput catalyst testing system that was operated using about 0.5 g of catalyst support samples. The results are compared, for example, in FIG. 1. Results show that red mud support catalytic activity for dry reforming is advantageously improved over MgO support catalytic activity for dry reforming.

FIG. 1 is a graph showing conversion percentage for $CH_4$ in a dry reforming process for unmodified red mud used as a catalyst support and for MgO used as a catalyst support. Experimental conditions in the dry reforming reactor included temperatures at about 700° C. and 750° C., and pressures at about 7 bar and 14 bar. In some embodiments, gas hourly space velocity (GHSV) of the mixed feed is between about 1000 $h^{-1}$ and 10000 $h^{-1}$, or at about 1477 $h^{-1}$. The tests were conducted for 20 hours. Catalysts tolerant at high pressure are favored for dry reforming processes. The feed was about 50 mol. % methane and about 50 mol. % $CO_2$ for both catalyst supports tested. The GHSV was calculated for the mixed feed, and GHSV generally measures the flow rate of the feed gases divided by the catalyst volume, which indicates the residence time of the reactants on the catalyst.

For dry reforming, the feed composition will include $CH_4$ and $CO_2$. In some embodiments for dry reforming, a feed will consist essentially of or consist of $CH_4$ and $CO_2$. Based on thermodynamics, the molar ratio of the feed for $CH_4$ to $CO_2$ can be about 1:1. However, some other embodiments showed that greater $CO_2$ concentrations up to 1:1.75 (mole $CH_4$ to mole $CO_2$) surprisingly and unexpectedly enhanced $H_2$ production according to Equation 1.

Methane conversion illustrated in FIG. 1 shows red mud catalyst support catalytic activity outperformed its counterpart, the MgO. Methane conversion by red mud reached up to 14%, and remained above that of MgO during the experiments' durations. On the other hand, MgO methane conversion maxed out at below about 4%. The greater conversion rate of red mud can be attributed in part to the presence of advantageous transition metals in the red mud.

By increasing $CH_4$ conversion, hydrogen production according to Equation 1 is also increased.

The singular forms "a," "an," and "the" include plural referents, unless the context clearly dictates otherwise. The term "about" when used with respect to a value or range refers to values including plus and minus 5% of the given value or range.

In the drawings and specification, there have been disclosed example embodiments of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for dry reforming with a red mud catalyst support composition, the method comprising the steps of:

providing a methane feed and carbon dioxide feed to react in a dry reforming reaction over the red mud catalyst support composition at a temperature between about 500° C. to about 1000° C. and a pressure between about 5 bar and about 20 bar to produce synthesis gas comprising $H_2$ and CO, the red mud catalyst support composition comprising:

caustic red mud waste material produced from an alumina extraction process from bauxite ore, where the methane conversion rate via dry reforming is at least about 4% for at least about 6 hours.

2. The method according to claim 1, where the red mud catalyst support composition further comprises at least one added catalytic metal, the added catalytic metal not being present at greater than about 1 wt. % in the caustic red mud waste material produced from the alumina extraction process from bauxite ore.

3. The method according to claim 2, where the at least one added catalytic metal is a Periodic Table Group 3-12 metal.

4. The method according to claim 1, where the increased temperature is between about 600° C. to about 800° C.

5. The method according to claim 1, where the increased temperature is between about 700° C. to about 750° C.

6. The method according to claim 1, where the increased pressure is between about 7 bar and about 15 bar.

7. The method according to claim 1, where the increased pressure is about 14 bar.

8. The method according to claim 1, where the methane conversion rate is at least about 10% for at least about 6 hours.

9. The method according to claim 1, where gas hourly space velocity of the methane feed and carbon dioxide feed mixed is between about 1000 $h^{-1}$ to 10000 $h^{-1}$.

10. The method according to claim 1, where the red mud catalyst support composition includes at least one component selected from the group consisting of: $Fe_2O_3$, $Al_2O_3$, $SiO_2$, $Na_2O$, CaO, and $TiO_2$.

11. The method according to claim 1, where a majority of particles of the red mud catalyst support composition have a particle size of less than about 70 μm.

12. The method according to claim 1, where a molar ratio of the methane feed to the carbon dioxide feed is between about 1:1 and about 1:1.75.

13. The method according to claim 1, where produced $H_2$ is at least about 5 mol. % of produced products from the dry reforming reaction.

14. The method according to claim 1, where the red mud catalyst support composition includes between about 20 wt. % and about 30 wt. % $Al_2O_3$, between about 5 wt. % and about 10 wt. % CaO, between about 15 wt. % and about 25 wt. % $Fe_2O_3$, between about 5 wt. % and about 15 wt. % $Na_2O$, between about 15 wt. % and about 25 wt. % $SiO_2$, and between about 5 wt. % and about 10 wt. % $TiO_2$.

* * * * *